United States Patent
Kovalchuk et al.

(12) 
(10) Patent No.: US 6,716,501 B2
(45) Date of Patent: Apr. 6, 2004

(54) MULTILAYERED FILM

(75) Inventors: John Kovalchuk, Painesville, OH (US); Bernard S. Mientus, Painesville, OH (US)

(73) Assignee: Avery Dennison Corporation, Pasadena, CA (US)

( * ) Notice: Subject to any disclaimer, the term of this patent is extended or adjusted under 35 U.S.C. 154(b) by 15 days.

(21) Appl. No.: 10/198,061

(22) Filed: Jul. 18, 2002

(65) Prior Publication Data

US 2004/0013890 A1 Jan. 22, 2004

(51) Int. Cl.$^7$ .................. B29D 22/00; B32B 27/36; B32B 27/34; B32B 27/08; B32B 27/30
(52) U.S. Cl. ............... 428/35.7; 428/412; 428/476.3; 428/483; 428/520; 428/522
(58) Field of Search ................ 428/520, 412, 428/475.8, 476.1, 476.3, 476.9, 477.7, 483, 516, 522, 35.7

(56) References Cited

U.S. PATENT DOCUMENTS

| | | | |
|---|---|---|---|
| 2,862,832 A | 12/1958 | Shepherd, Jr. | 117/3.2 |
| 2,882,599 A | 4/1959 | Martin | 30/294 |
| 2,990,311 A | 6/1961 | Shepherd, Jr. | 154/95 |
| 3,043,732 A | 7/1962 | Shepherd, Jr. | 156/230 |
| 3,108,850 A | 10/1963 | Brandt | 18/55 |
| 3,207,822 A | 9/1965 | Makowski | 264/94 |
| 3,231,419 A | 1/1966 | Korpman | 117/122 |
| 3,239,478 A | 3/1966 | Harlan, Jr. | 260/27 |
| 3,380,868 A | 4/1968 | Moser | 156/229 |
| 3,484,976 A | 12/1969 | Shea | 40/310 |
| 3,503,826 A | 3/1970 | Nasica | 156/245 |
| 3,616,015 A | 10/1971 | Kingston | 156/230 |
| 3,625,752 A | 12/1971 | Korpman | 117/122 |
| 3,676,202 A | 7/1972 | Korpman | 117/122 |
| 3,723,170 A | 3/1973 | Korpman | 117/122 |
| 3,733,002 A | 5/1973 | Fujio | 215/12 |
| 3,758,661 A | 9/1973 | Yamamoto | 264/230 |
| 3,783,072 A | 1/1974 | Korpman | 156/244 |
| 3,932,328 A | 1/1976 | Korpman | 260/27 |
| 3,940,001 A | 2/1976 | Haefner et al. | 215/1 |
| 3,959,908 A | 6/1976 | Lowe | 40/301 |
| 4,028,292 A | 6/1977 | Korpman | 260/27 |

(List continued on next page.)

FOREIGN PATENT DOCUMENTS

| | | |
|---|---|---|
| CA | 2044079 | 3/1992 |
| CA | 2012357 | 11/1999 |
| EP | 0 436 044 A1 | 7/1991 |

(List continued on next page.)

OTHER PUBLICATIONS

International Search Report; Application No. PCT/US03/17241, dated Oct. 3, 2003.

*Primary Examiner*—Paul Thibodeau
*Assistant Examiner*—Kevin R Kruer
(74) *Attorney, Agent, or Firm*—Renner, Otto, Boisselle & Sklar, LLP

(57) ABSTRACT

This invention relates to a multilayered film for use as in-mold label, comprising: a core layer having a first surface and a second surface, the core layer being comprised of a polymeric material and particulate solids dispersed in the polymeric material; and a first skin layer overlying the first surface of the core layer; the film being formed by co-extruding the core layer and first skin layer to form the multilayered film, hot-stretching the film at a temperature above the expected service temperature of the label to provide the film with a machine direction orientation, the density of the film being reduced by about 5% to about 25% during hot-stretching, and annealing the film at a temperature above the expected service temperature of the label; the film having a machine direction Gurley stiffness value in the range of about 30 to about 120, a machine direction shrinkage of less than about 2%, and a machine direction shrink tension at 200° F. (93.3° C.) of less than about 100 psi.

23 Claims, 3 Drawing Sheets

U.S. PATENT DOCUMENTS

| | | | | |
|---|---|---|---|---|
| 4,081,309 A | 3/1978 | Jenkins | ................ | 156/250 |
| 4,137,081 A | 1/1979 | Pohl | ...................... | 96/87 |
| 4,174,218 A | 11/1979 | Pohl | ...................... | 430/306 |
| 4,175,460 A | 11/1979 | McPhail | .................. | 83/856 |
| 4,228,232 A | 10/1980 | Rousseau | ................ | 430/271 |
| 4,271,531 A | 6/1981 | Torii et al. | .............. | 455/182 |
| 4,355,967 A | 10/1982 | Hellmer | .................. | 425/503 |
| 4,359,314 A | 11/1982 | Hellmer | .................. | 425/503 |
| 4,377,616 A | 3/1983 | Ashcraft et al. | .......... | 428/213 |
| D269,154 S | 5/1983 | Freedman et al. | .......... | D8/98 |
| 4,393,115 A | 7/1983 | Yoshii et al. | ............. | 428/323 |
| 4,398,985 A | 8/1983 | Eagon | ...................... | 156/233 |
| 4,406,411 A | 9/1983 | Gall et al. | ................ | 428/577 |
| 4,426,422 A | 1/1984 | Daniels | .................... | 428/352 |
| 4,456,934 A | 6/1984 | Wedman et al. | ............ | 360/78 |
| 4,479,770 A | 10/1984 | Slat et al. | ................ | 425/503 |
| 4,479,771 A | 10/1984 | Slat et al. | ................ | 425/503 |
| 4,501,797 A | 2/1985 | Super et al. | .............. | 428/349 |
| 4,528,055 A | 7/1985 | Hattemer | .................. | 156/247 |
| 4,528,221 A | 7/1985 | Komatsuzaki et al. | ...... | 428/35 |
| 4,544,590 A | 10/1985 | Egan | ........................ | 428/40 |
| 4,567,681 A | 2/1986 | Fumei | ....................... | 40/310 |
| 4,582,752 A | 4/1986 | Duncan | .................. | 428/317.9 |
| 4,599,253 A | 7/1986 | Bree | ........................ | 428/40 |
| 4,601,926 A | 7/1986 | Jabarin et al. | .............. | 428/35 |
| 4,616,992 A | 10/1986 | Oles | ......................... | 425/503 |
| 4,626,455 A | 12/1986 | Karabedian | ................ | 428/35 |
| 4,639,207 A | 1/1987 | Slat et al. | ................ | 425/503 |
| 4,704,310 A | 11/1987 | Tighe et al. | .............. | 427/261 |
| 4,704,323 A | 11/1987 | Duncan et al. | ............ | 428/286 |
| 4,710,338 A | 12/1987 | Bagnall et al. | ............ | 264/509 |
| 4,713,273 A | 12/1987 | Freedman | .................. | 428/40 |
| 4,720,416 A | 1/1988 | Duncan | .................... | 428/195 |
| 4,721,531 A | 1/1988 | Wildeman et al. | .......... | 106/309 |
| 4,721,638 A | 1/1988 | Matsuguchi et al. | ........ | 428/40 |
| 4,729,864 A | 3/1988 | Chang et al. | .............. | 264/509 |
| 4,737,098 A | 4/1988 | Oles et al. | ................ | 425/503 |
| 4,746,556 A | 5/1988 | Matsuguchi et al. | ........ | 428/40 |
| 4,758,396 A | 7/1988 | Crass et al. | ................ | 264/145 |
| 4,794,284 A | 12/1988 | Buon | ........................ | 310/12 |
| 4,808,366 A | 2/1989 | Kaminski et al. | .......... | 264/509 |
| 4,834,641 A | 5/1989 | Keyser | ...................... | 425/503 |
| 4,837,075 A | 6/1989 | Dudley | ...................... | 428/220 |
| 4,837,088 A | 6/1989 | Freedman | .................. | 156/243 |
| 4,863,772 A | 9/1989 | Cross | ........................ | 428/40 |
| 4,872,707 A | 10/1989 | deBruin | .................... | 283/102 |
| 4,873,088 A | 10/1989 | Mayhew et al. | ............ | 424/450 |
| 4,883,697 A | 11/1989 | Dornbusch et al. | ........ | 428/35.7 |
| 4,886,698 A | 12/1989 | Purdy | ........................ | 428/213 |
| 4,892,689 A | 1/1990 | Van Cappellen et al. | .... | 264/25 |
| 4,892,779 A | 1/1990 | Leatherman et al. | ........ | 428/220 |
| 4,904,324 A | 2/1990 | Heider | ...................... | 156/214 |
| 4,925,714 A | 5/1990 | Freedman | .................. | 428/40 |
| 4,935,300 A | 6/1990 | Parker et al. | .............. | 428/352 |
| 4,946,532 A | 8/1990 | Freeman | .................... | 156/243 |
| 4,953,313 A | 9/1990 | Scott | ........................ | 40/301 |
| 4,983,348 A | 1/1991 | Barresi et al. | .............. | 264/509 |
| 4,986,866 A | 1/1991 | Ohba et al. | ................ | 156/220 |
| 5,019,436 A | 5/1991 | Schramer et al. | .......... | 428/40 |
| 5,026,266 A | 6/1991 | Takasaki et al. | ............ | 425/150 |
| 5,026,592 A | 6/1991 | Janocha et al. | ............ | 428/204 |
| 5,032,344 A | 7/1991 | Kaminski | .................. | 264/509 |
| 5,042,842 A | 8/1991 | Green et al. | ................ | 283/101 |
| 5,073,435 A | 12/1991 | Eyraud et al. | .............. | 428/215 |
| 5,075,583 A | 12/1991 | Sakagami et al. | ............ | 310/12 |
| 5,076,977 A | 12/1991 | Maier et al. | ................ | 264/25 |
| 5,079,057 A | 1/1992 | Heider | ...................... | 428/36.5 |
| 5,104,719 A | 4/1992 | Kamen et al. | .............. | 428/195 |
| 5,126,197 A | 6/1992 | Schinkel et al. | ............ | 428/349 |
| 5,152,946 A | 10/1992 | Gillette | ...................... | 264/230 |
| 5,186,782 A | 2/1993 | Freedman | .............. | 156/244.11 |
| 5,206,075 A | 4/1993 | Hodgson, Jr. | .............. | 428/216 |
| 5,223,315 A | 6/1993 | Katsura et al. | .......... | 428/36.92 |
| 5,227,233 A | 7/1993 | Itaba et al. | ................ | 428/354 |
| 5,254,302 A | 10/1993 | Yamanaka | .................. | 264/129 |
| 5,284,681 A | 2/1994 | Shinonaga et al. | ......... | 427/316 |
| 5,284,688 A | 2/1994 | Hiatt | ......................... | 428/40 |
| 5,288,548 A | 2/1994 | Weber | ...................... | 428/315.9 |
| 5,308,693 A | 5/1994 | Ryle et al. | ................ | 428/307.3 |
| 5,332,542 A | 7/1994 | Yamanaka et al. | .......... | 264/509 |
| 5,405,667 A | 4/1995 | Heider | ...................... | 428/36.5 |
| 5,419,960 A | 5/1995 | Touhsaent | .................. | 428/331 |
| 5,424,650 A | 6/1995 | Frick | ......................... | 324/688 |
| 5,462,807 A | 10/1995 | Halle et al. | ................ | 428/500 |
| 5,475,075 A | 12/1995 | Brant et al. | .............. | 526/348.3 |
| 5,495,944 A | 3/1996 | Lermer | .................... | 206/459.1 |
| 5,530,065 A | 6/1996 | Farley et al. | ................ | 525/240 |
| 5,562,962 A | 10/1996 | Tung | ......................... | 428/200 |
| 5,587,214 A | 12/1996 | Mitchell, Jr. | ................ | 428/40.1 |
| 5,589,246 A | 12/1996 | Calhoun et al. | ............ | 428/120 |
| 5,595,810 A | 1/1997 | Beinert et al. | .............. | 428/156 |
| 5,604,006 A | 2/1997 | Ponchaud et al. | ............ | 428/67 |
| 5,614,146 A | 3/1997 | Nakamura et al. | .......... | 264/511 |
| 5,711,839 A | 1/1998 | Dronzek, Jr. | .............. | 156/277 |
| 5,725,261 A | 3/1998 | Rahn | ......................... | 292/307 |
| 5,811,163 A | 9/1998 | Ohno et al. | ................ | 428/35.7 |
| 5,876,816 A | 3/1999 | Freedman | .................. | 428/40.1 |
| 6,001,208 A | 12/1999 | Kinoshita et al. | ............ | 156/245 |
| 6,228,486 B1 | 5/2001 | Kittel et al. | ................ | 428/354 |
| 6,287,684 B1 | 9/2001 | Yamanaka et al. | .......... | 428/343 |
| 6,294,236 B1 | 9/2001 | Freedman | .................. | 428/40.1 |
| 6,312,825 B1 | 11/2001 | Su et al. | .................... | 428/484 |
| 6,551,671 B1 | 4/2003 | Nishizawa et al. | ........ | 428/34.1 |
| 2001/0028952 A1 | 10/2001 | Nishizawa et al. | ........ | 428/336 |
| 2002/0050319 A1 | 5/2002 | Nishizawa et al. | ......... | 156/245 |
| 2002/0150706 A1 | 10/2002 | Tachi et al. | ................ | 428/34.5 |

FOREIGN PATENT DOCUMENTS

| | | |
|---|---|---|
| EP | 0 471 854 A1 | 2/1992 |
| EP | 0 600 482 B1 | 4/1998 |
| EP | 1 055 715 A1 | 11/2000 |
| EP | 1 176 003 A1 | 1/2002 |
| EP | 1 302 300 A1 | 4/2003 |
| GB | 2 201 681 A | 7/1988 |
| JP | 2-217223 | 8/1990 |
| WO | 93/03093 | 2/1993 |
| WO | 93/04842 | 3/1993 |

MULTILAYERED FILM

TECHNICAL FIELD

This invention relates to multilayered films and, more particularly, to multilayered films which are useful in making in-mold labels. Labels of this type are referred to as "in-mold" labels because the labels are held in place within the mold which forms the container during the container-forming process.

BACKGROUND OF THE INVENTION

Polymeric in-mold labels offer many aesthetic and functional advantages over paper labels in the labeling of containers made from polymeric resins using blow-molding, injection-molding or injection-blow molding. When a plastic container such as a high density polyethylene (HDPE) squeeze bottle is used to package a product such as a hair shampoo, a package using a polymeric label is generally more appealing to consumers than a package using a paper label. In many applications the use of polymeric in-mold labels is required for reasons of appearance, handling, performance, moisture-resistance, conformability, durability and compatibility with the container to be labeled. Polymeric in-mold labels also enable clear or substantially transparent labels with only the label indicia being visible to the consumer.

A problem with polymeric in-mold labels is that they tend to shrink and increase in thickness or the "Z" direction during the container-forming process. This is believed to be due to increases in film thickness caused by foaming. This foaming is believed to be a result of air entrapment in cavitated regions in the film and heat applied to the film during blow molding. Biaxially oriented films tend to foam more than uniaxially or machine direction oriented films. As a result, these labels, when applied to a container, typically exhibit a surface roughness that detracts from the aesthetics of the graphic or printed image formed on the label.

The present invention provides a solution to this problem by providing a multilayered film that exhibits only minimal surface roughening after application as an in-mold label to a container. The labels made from this film, when applied to a container, typically exhibit a surface roughness on the print surface of about 100 microinches or less, as determined by test method ANSI B46.1. This compares to labels in the prior art which have been observed to exhibit a surface roughness that detracts from the aesthetics of the graphic or printed image formed on the label and have a surface roughness of about 200 microinches.

SUMMARY OF THE INVENTION

This invention relates to a multilayered film for use in making an in-mold label, comprising:

a core layer having a first surface and a second surface, the core layer being comprised of a polymeric material and particulate solids dispersed in the polymeric material, the polymeric material being a high density polyethylene, a polypropylene, a polystyrene, a polyester, a copolymer of ethylene and propylene, a polyester copolymer, a polyamide, a polycarbonate or a mixture of two or more thereof;

a first skin layer overlying the first surface of the core layer, the first skin layer being comprised of a thermoplastic copolymer or terpolymer derived from ethylene or propylene and a functional monomer selected from the group consisting of alkyl acrylate, acrylic acid, alkyl acrylic acid, vinyl acetate and combinations of two or more thereof;

the film being formed by co-extruding the core layer and the first skin layer to form the multilayered film, hot-stretching the film at a temperature above the expected service temperature of the label to provide the film with a machine direction orientation, and annealing the film at a temperature above the expected service temperature of the label;

the density of the film being reduced by about 5% to about 25% during hot-stretching;

the film having a machine direction Gurley stiffness value in the range of about 30 to about 120 after hot-stretching and annealing;

the film having a machine direction shrinkage of less than about 2% after hot-stretching and annealing;

the film having a machine direction shrink tension at 200° F. (93.3° C.) of less than about 100 pounds per square inch (psi) after hot-stretching and annealing.

In one embodiment, the inventive film further comprises a second skin layer overlying the second surface of the core layer.

In one embodiment, the inventive film further comprises a first opacifying layer positioned between the first surface of the core layer and the first skin layer.

In one embodiment, the inventive film further comprises a first tie layer positioned between the first surface of the core layer and the first skin layer.

In one embodiment, the inventive film further comprises a second skin layer overlying the second surface of the core layer, a first opacifying layer positioned between the first surface of the core layer and the first skin layer, and a second opacifying layer positioned between the second surface of the core layer and the second skin layer.

In one embodiment, the inventive film further comprises a second skin layer overlying the second surface of the core layer, a first tie layer positioned between the first surface of the core layer and the first skin layer, and a second tie layer positioned between the second surface of the core layer and the second skin layer.

In one embodiment, the inventive film further comprises a second skin layer overlying the second surface of the core layer, a first opacifying layer positioned between the first surface of the core layer and the first skin layer, a first tie layer positioned between the first opacifying layer and the first skin layer, a second opacifying layer positioned between the second surface of the core layer and the second skin layer, and a second tie layer positioned between the second opacifying layer and the second skin layer.

The invention also relates to in-mold labels made from the inventive film, and to polymeric containers having the in-mold labels adhered to their surface. The in-mold labels include relatively large labels (e.g., surface area of about 12 square inches or larger), and the polymeric containers include relatively large containers (e.g., volume of about 32 fluid ounces or larger). The labels, when applied to the polymeric containers, are characterized by a printed surface having a very smooth texture, that is, a printed surface that exhibits a surface roughness of up to about 100 microinches as measured by test method ANSI B46.1.

BRIEF DESCRIPTION OF THE DRAWINGS

In the following drawings, like parts and features have like designations.

DETAILED DESCRIPTION OF THE INVENTION

The term "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer.

The term "high density polyethylene" or "HDPE" refers to a polyethylene having a density of about 0.940 to about 0.965 g/cc.

The term "service temperature of the label" is the temperature of the label when used as an in-mold label while in the mold for making a polymeric container. The service temperature of the label may range from about 200° F. (93.3° C.) to about 290° F. (143.3° C.), and in one embodiment about 200° F. (93.3° C.) to about 260° F. (126.7° C.), and in one embodiment about 220° F. (104.4° C.) to about 260° F. (126.7° C.).

Figure 1:
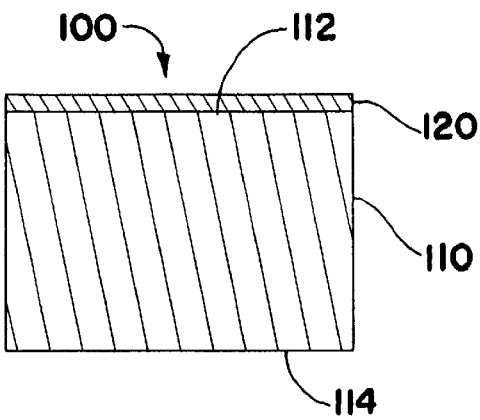
FIG. 1 is a schematic illustration of the side view of a multilayered film embodying the present invention in a particular form.

Referring to FIG. 1, the inventive multilayered film, in one of its illustrated embodiments, is generally indicated by the reference numeral 100, and is comprised of: a core layer 110 which has a first surface 112 and a second surface 114; and first skin layer 120 overlying the first surface 112 of the core layer 110.

Figure 2:
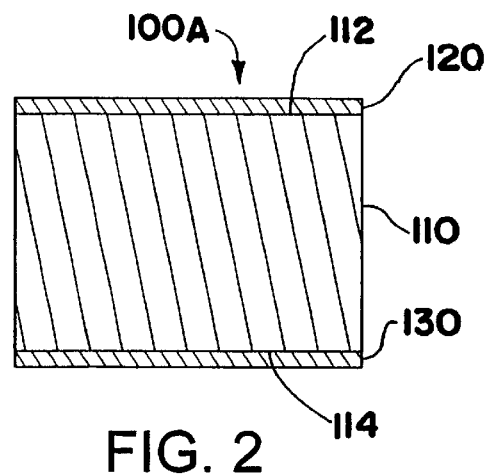
FIG. 2 is a schematic illustration of the side view of a multilayered film embodying an alternate embodiment of the present invention.

Referring to FIG. 2, the inventive multilayered film, in another of its illustrated embodiments, is generally indicated by the reference numeral 100A, and is comprised of: the core layer 110 which has the first surface 112 and second surface 114; the first skin layer 120 overlying the first surface 112 of the core layer 110; and a second skin layer 130 overlying the second surface 114 of the core layer 110.

Figure 3:
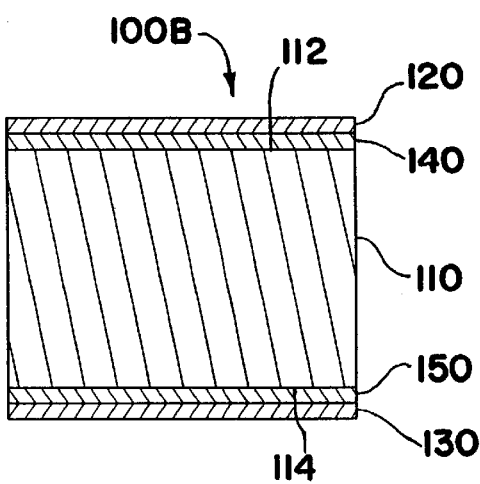
FIG. 3 is a schematic illustration of the side view of a multilayered film embodying another alternate embodiment of the invention.

Referring to FIG. 3, the inventive multilayered film, in another of its illustrated embodiments, is generally indicated by the reference numeral 100B, and is comprised of: the core layer 110 which has the first surface 112 and the second surface 114; the first skin layer 120 overlying the first surface 112 of the core layer 110; a first tie layer 140 positioned between the first surface 112 of the core layer 110 and the first skin layer 120; the second skin layer 130 overlying the second surface 114 of the core layer 110; and a second tie layer 150 positioned between the second surface 114 of the core layer 110 and the second skin layer 130.

Figure 4:
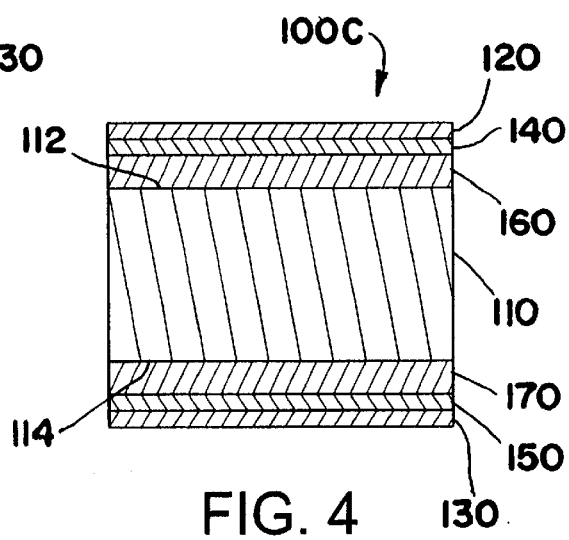
FIG. 4 is a schematic illustration of the side view of a multilayered film embodying still another alternate embodiment of the invention.

Referring to FIG. 4, the inventive multilayered film, in another of its illustrated embodiments, is generally indicated by the reference numeral 100C, and is comprised of: the core layer 110 which has the first surface 112 and the second surface 114; the first skin layer 120 overlying the first surface 112 of the core layer 110; the first tie layer 140 positioned between the first surface 112 of the core layer 110 and the first skin layer 120; the second skin layer 130 overlying the second surface 114 of the core layer 110; the second tie layer 150 positioned between the second surface 114 of the core layer 110 and the second skin layer 130; a first opacifying layer 160 positioned between the first surface 112 of the core layer 110 and the first tie layer 140; and a second opacifying layer 170 positioned between the second surface 114 of the core layer 110 and the second tie layer 150.

The overall thickness of the multilayered films 100, 100A, 100B and 100C may be in the range of about 2.5 to about 8 mils, and in one embodiment about 2.5 to about 6 mils, and in one embodiment about 2.5 to about 4.5 mils, and in one embodiment about 3 to about 4 mils. The thickness of the core layer 110 may range from about 70 to about 99% of the overall thickness of the multilayered films 100, 100A and 100B, and in one embodiment about 70% to about 95%, and in one embodiment about 85% of the overall thickness of the films 100, 100A and 100B. The core layer 110 may have a thickness of about 45 to about 89% of the overall thickness of the film 100C, and in one embodiment about 60% to about 85%, and in one embodiment about 70% of the overall thickness of the film 100C. The first skin layer 120 may have a thickness of about 1 to about 15% of the overall thickness of the films 100, 100A, 100B and 100C, and in one embodiment 1 to about 5%, and in one embodiment about 2.5% of the overall thickness of the films 100, 100A, 100B and 100C. The second skin layer 130 may have a thickness equal to about 1 to about 15% of the overall thickness of the films 100, 100A, 100B and 100C, and in one embodiment 1 to about 5%, and in one embodiment about 2.5% of the overall thickness of the films 100, 100A, 100B and 100C. Each of the tie layers 140 and 150 may have a thickness equal to about 3 to about 12% of the overall thickness of the films 100B and 100C, and in one embodiment about 3 to about 7%, and in one embodiment about 5% of the overall thickness of the films 100B and 100C. Each of the opacifying layers 160 and 170 may have a thickness equal to about 5 to about 40% of the overall thickness of the film 100C, and in one embodiment about 5 to about 20%, and in one embodiment about 7.5% of the overall thickness of the film 100C.

The core layer 110 and the opacifying layers 160 and 170 may be independently comprised of a film forming polymeric material which may be a high density polyethylene, a polypropylene, a copolymer of ethylene and propylene, a polystyrene, a polyamide (e.g., nylon), a polyester (e.g., polyethylene terephthalate), a polyester copolymer, a polycarbonate, or a mixture of two or more thereof. In one embodiment, the polymeric material is polypropylene. An example of a commercially available polypropylene that can be used is available from Union Carbide-Dow under the trade designation 5A97. This material is identified as having a melt flow rate of 3.9 g/10 min. (ASTM D1238), a density of 903 kg/m$^3$ and a flexural or flex modulus of 1,590 MPa (ASTM D790A).

The particulate solids may be any particulate solids that remain at least partially in separate phase from the polymeric mixture used in the core layer 110 and opacifying layers 160 and 170 during the hot-stretching step used in making the inventive films. The particulate solids may be organic or inorganic. Examples of organic particulate solids that may be used include polystyrene, rubber modified polystyrene, acrylonitrile-butadine-styrene (ABS), polymethyl methacrylate, polycarbonate, polyamide (e.g., nylon); high density polyethylene; polyester (e.g., polyethylene terephthalate); polyacetal; polypropylene; and acrylic resins. Examples of inorganic particulate solids that may be used include solid and hollow preformed glass spheres, metal beads or spheres; ceramic particles; titanium dioxide; calcium carbonate; barium sulfate; chalk; silicon dioxide; and clay. In one embodiment, the particulate solids are calcium carbonate. These particulate solids may have a mean particle size in the range of about 0.1 to about 12 microns, and in one embodiment about 0.5 to about 5 microns, and in one embodiment about 1 to about 3 microns. In one embodiment, the mean particle size is about 1 micron. In one embodiment, the mean particle size is about 3 microns. In one embodiment, a mixture of particulate solids is used, the mixture comprising particulate solids having a mean particle size of about 1 micron and particulate solids having a mean particle size of about 3 microns.

In one embodiment, a concentrate containing the particulate solids and a resin carrier is added to the mixture used to extrude the layers 110, 160 and/or 170. The concentrate may contain, for example, about 20% to about 80% by weight solids, and about 20% to about 80% by weight resin carrier. The resin carrier may be any thermoplastic polymer having a melting point or glass transition temperature in the range of about 90° C. to about 250° C. Examples include polyethylene, polypropylene, polystyrene, rubber modified polystyrene, ABS, polymethyl methacrylate, polycarbonate, ethylene methylacrylate, and the like. In one embodiment, a calcium carbonate concentrate is used which is comprised of a blend of about 50% to about 80% by weight polypropylene and about 20% to about 50% by weight calcium carbonate. An example of a commercially available concentrate that can be used is available from A. Schulman Inc. under the trade designation PF92D, which is identified as a calcium carbonate concentrate having a calcium carbonate concentration of 40% by weight in a polypropylene homopolymer carrier resin. Another example is A. Shulman Inc. PF97N, which is identified as a calcium carbonate concentrate having a calcium carbonate concentration of 70% by weight in a polypropylene homopolymer resin; the calcium having a mean particle size of one micron. In one embodiment, the concentrate is dried prior to being mixed with the remaining materials used in making the layers 110, 160 and/or 170 to insure that the concentrate contains little or no moisture.

The concentration of particulate solids in the core layer 110 and the opacifying layers 160 and 170 independently may range from 15% to about 35% by weight based on the overall weight of each of such layers, and in one embodiment about 20% to about 30% by weight.

The core layer 110 may include one or more pigments. The pigments that may be used include titanium dioxide. In one embodiment, a concentrate containing the pigment and a resin carrier is added to the mixture used to extrude the core layer. The concentrate may contain about 20% to about 80% by weight pigment, and about 80% to about 20% by weight resin carrier. The resin carrier may be any thermoplastic polymer having a melting point or glass transition temperature in the range of about 90° C. to about 250° C. Examples include polyethylene, polypropylene, polystyrene, rubber modified polystyrene, ABS, polymethyl methacrylate, polycarbonate, and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename Polybatch P8555-SD, which is identified as a white color concentrate having a titanium dioxide concentration of 50% by weight in a polypropylene homopolymer carrier resin. The concentration of pigment in the core layer 110 may be up to about 70% by weight based on the weight of the core layer, and in any embodiment in the range of about 1% to about 40% by weight, and in one embodiment about 1 to about 20% by weight, and in one embodiment about 1% to about 10% by weight, and in one embodiment about 5.5% by weight.

The first skin layer 120 and the second skin layer 130 may be comprised of a thermoplastic copolymer or terpolymer derived from ethylene or propylene and a functional monomer selected from the group consisting of alkyl acrylate, acrylic acid, alkyl acrylic acid, vinyl acetate and combinations of two or more thereof. In one embodiment, the functional monomer is selected from the group consisting of alkyl acrylate, acrylic acid, alkyl acrylic acid, and combinations of two ore more thereof. The alkyl groups in the alkyl acrylates and the alkyl acrylic acids typically contain 1 to about 8 carbon atoms, and in one embodiment 1 to about 2 carbon atoms. The functional monomer(s) component of the copolymer or terpolymer may range from about 1 to about 15 mole percent, and in one embodiment about 1 to about 10 mole percent of the copolymer or terpolymer molecule. Examples include: ethylene/vinyl acetate copolymers; ethylene/methyl acrylate copolymers; ethylene/ethylacrylate copolymers; ethylene/butyl acrylate copolymers; ethylene/methacrylic acid copolymers; ethylene/acrylic acid copolymers; ethylene/methacrylic acid copolymers containing sodium or zinc (also referred to as ionomers); acid-, anhydride- or acrylate-modified ethylene/vinyl acetate copolymers; acid- or anhydride-modified ethylene/acrylate copolymers; anhydride-modified low density polyethylenes; anhydride-modified linear low density polyethylene, and mixtures of two or more thereof. In one embodiment, ethylene/vinyl acetate copolymers that are particularly useful include those with a vinyl acetate content of at least about 10% by weight, and in one embodiment about 18% to about 25% by weight. Examples of commercially available copolymers and terpolymers that can be used include the ethylene/vinyl acetate copolymers available from AT Plastics under the tradename EVA 1821. These copolymers and terpolymers may be present in the skin layers 120 and 130 at concentrations of up to about 50% by weight, and in one embodiment about 10 to about 35% by weight, and in one embodiment about 50% by weight.

The first skin layer 120 and the second skin layer 130 may be further comprised of an additional thermoplastic polymeric material. This polymeric material may be a high density polyethylene, polystyrene, rubber modified polystryene, acrylonitrile butadiene styrene (ABS), polypropylene, polyvinylidene fluoride, polyester, cylic olefin copolymer, and mixtures of two or more thereof. An example of a commercially available material that may be used is Union Carbide-Dow 5A97. Another example is Equistar H6012 which is identified as a high density polyethylene. This polymeric material may be present in the layers 120 and 130 at a concentration of about 25 to about 100 percent by weight, and in one embodiment about 60 to about 95 percent by weight.

The tie layers 140 and 150 may be comprised of one or more adhesive materials optionally in combination with one or more additional film forming thermoplastic polymeric materials. The adhesive materials include ethylene vinyl acetate copolymers, ethylene methyl acrylate copolymers and ethylene butyl acrylate copolymers. An example of a commercially available material that can be used is the ethylene methyl acrylate copolymer available from Exxon-Mobil under the trade designation Optema TC 120. This material is identified as having a methyl acrylate content of 21.5% by weight, a density of 0.942 g/cc, and a melt index of 6.0 g/10 min. Another example is AT Plastics EVA 1821. The additional film forming thermoplastic polymeric materials that can be used include polypropylene, copolymers of ethylene and propylene, medium density polyethylene (density of about 0.924 to about 0.939 g/cc), terpolymers of ethylene, vinyl acetate and malic anhydride, and terpolymers of ethylene, vinyl acetate and acrylic acid. An example of a commercial thermoplastic polymeric material that may be used is Union Carbide-Dow 5A97. The weight ratio of adhesive material to additional film forming thermoplastic polymeric material may range from about 10:90 to about 100:0, and in one embodiment about 40:60 to about 70:30, and in one embodiment about 50:50.

In one embodiment, one or more of the layers 110, 120, 130, 140, 150, 160 or 170 contains one or more antistatic additives. These are used to dissipate static electricity charges. The antistatic additives that are useful include amines, amides, and derivatives of fatty acids. The amount of antistatic additive that is used may be varied for particular formulations and processing conditions. In one embodiment, the amount that is used may range up to about 1% by weight, and in one embodiment from about 0.01% to about 1%, and in one embodiment about 0.01 to about 0.5% by weight, and in one embodiment from about 0.05% to about 0.2% by weight. An example of antistatic additive that may be used is available from A. Schulman Inc. under the product name Polybatch VLA-55-SF. Polybatch VLA-55-SF is identified as a silica free antistatic additive concentrate containing 5% by weight of an antistatic additive dispersed in polypropylene.

The hot-stretching and annealing steps used in making the inventive film enhance the physical properties of the film. Hot-stretching is performed at a temperature above the expected service temperature of the label and provides the film with a machine direction orientation. The density of the film is reduced during this step by about 5% to about 25%, and in one embodiment about 15% to about 20%. The film is annealed at a temperature above the expected service temperature of the label to reduce shrinking, relaxing or distortion of the film which may interfere with the in-mold labeling process. During the hot-stretching and annealing steps, the extrudate is advanced through a series of relatively hot and cool rolls which contact the extrudate and impart heat to the extrudate or remove heat from it under time-temperature-direction conditions established by line speed, temperature, roll size, and side of contact. The direction at which the film advances through the rolls is the direction at which the film is hot-stretched and is oriented. This direction is sometimes referred to as the "machine direction." The term "cross direction" is used herein to refer to the direction going across the film at an angle of 90° from the machine direction.

During the hot-stretching step, the film is stretched and this stretching causes voids to form adjacent to or around the particulate solids. The solids act as "seeds" for the voids. The degree of stretching is controlled to provide the density reduction of about 5% to about 25%, as indicated above. While not wishing to be bound by theory, it is believed that this controlled stretching and void formation followed by the above-indicated annealing step is responsible for the relatively smooth print surfaces that are achieved with the inventive labels.

Figure 5:
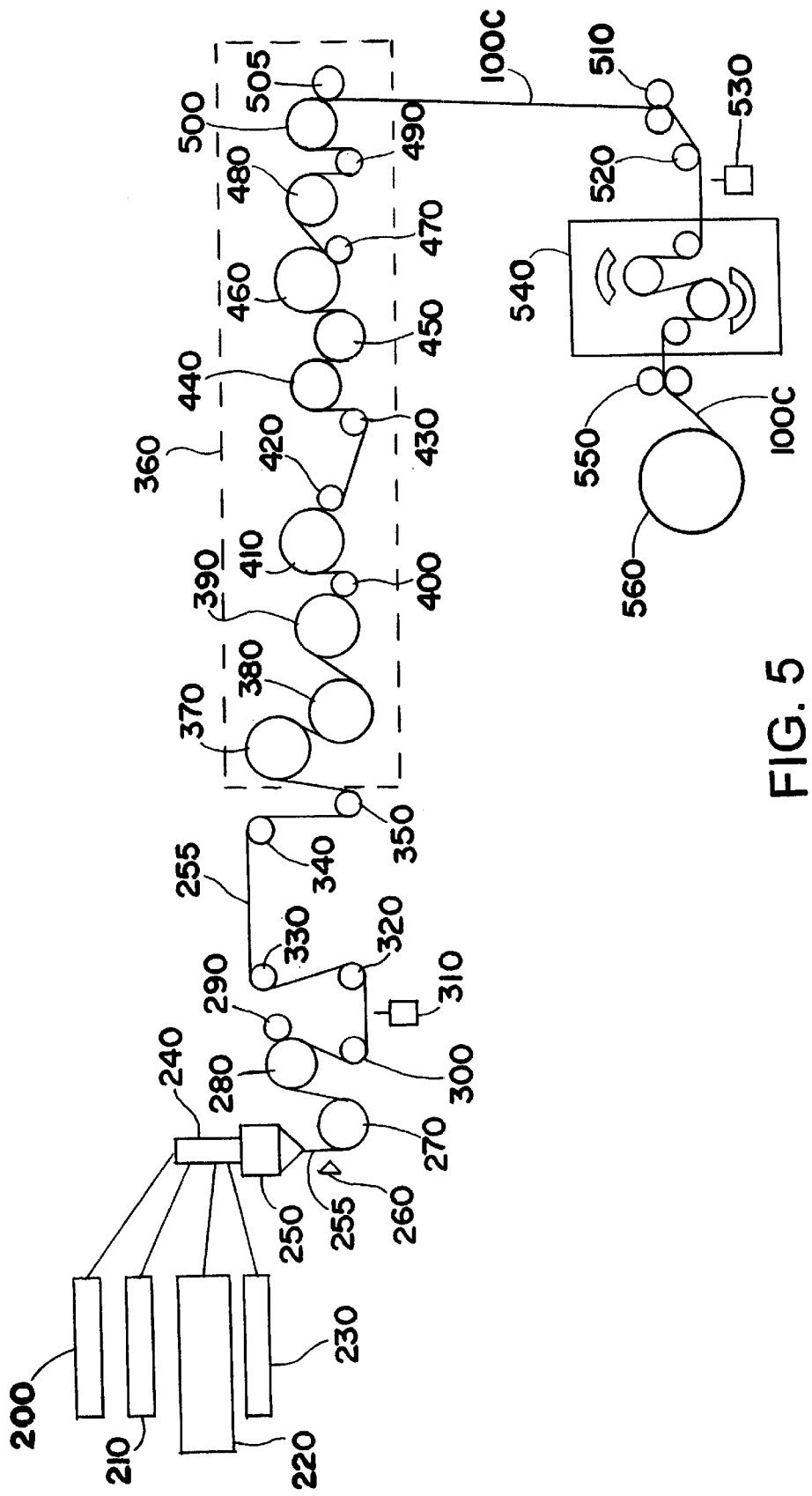
FIG. 5 is a flow diagram illustrating a co-extruding, stretching and annealing line used to make the inventive multilayered film.

The inventive multilayered film may be co-extruded, hot-stretched and annealed using the processing line depicted in FIG. 5. The processing line depicted in FIG. 5 will be described with reference to the 100C illustrated in FIG. 4, but those skilled in the art will recognize that it is also suitable for making any of the films 100, 100A or 100B. The processing line includes extruders 200, 210, 220 and 230, feed block 240 and die 250. Extruder 200 is used for extruding first skin layer 120 and second skin layer 130. Extruder 210 is used for extruding tie layers 140 and 150. Extruder 220 is used for extruding core layer 110. Extruder 230 is used for extruding opacifying layers 160 and 170. The extrudate from the extruder 200 is advanced to the feed block 240 while at a temperature in the range of about 400° F. (204.4° C.) to about 470° F. (243.3° C.), and in one embodiment about 410° F. (210° C). The extrudates from the extruders 210, 220 and 230 are advanced to the feed block 240 while at a temperature in the range of about 400° F. (204.4° C.) to about 470° F. (243.3° C.), and in one embodiment about 430° F. (221.1° C.). The extrudates from each of the extruders 200, 210, 220 and 230 are combined in feedblock 240 and extruded through die 250 to form film extrudate 255. Feedblock 240 and die 250 are operated at a temperature in the range of about 400° F. (204.4° C.) to about 470° F. (243.3° C.), and in one embodiment about 445° F. (229.4° C.). The film extrudate 255 extruded from die 250 may have a film thickness of about 10 to about 20 mils, and in one embodiment about 12 to about 15 mils. Air knife 260 is used to adhere film extrudate 255 to cast roll 270. The film extrudate 255 is advanced from cast roll 270 to cast roll 280, over cast roll 280, between cast roll 280 and cast nip roll 290, and then over guide rolls 300, 320, 330, 340 and 350 to machine direction orientation unit 360. Cast roll 270 is operated at a temperature of about 150° F. (65.6° C.) to about 200° F. (93.3° C.), and in one embodiment about 175° F. (79.4° C.). Cast roll 280 is operated at a temperature of about 100° F. (37.8° C.) to about 1 50° F. (65.6° C.), and in one embodiment about 120° F. (48.9° C.). The film is advanced over cast rolls 270 and 280 at a rate of about 40 to about 110 feet per minute, and in one embodiment about 85 feet per minute. The thickness of the film 255 is monitored using film thickness measuring device 310 as the film advances from guide roll 300 to guide roll 320. In the machine direction orientation unit 360, the film advances from pre-heat roll 370 to pre-heat roll 380. Pre-heat roll 370 is operated at a temperature of about 200° F. (93.3° C.) to about 270° F. (132.2° C.), and in one embodiment about 260° F. (126.7° C.). The film is advanced over pre-heat roll 370 at a rate of about 40 to about 110 feet per minute, and in one embodiment at about 86 feet per minute. Pre-heat roll 380 is operated at a temperature of about 200° F. (93.3° C.) to about 270° F. (132.2° C.), and in one embodiment about 260° F. (126.7° C.). The film advances over pre-heat roll 380 at a rate of about 40 to about 120 feet per minute, and in one embodiment about 89 feet per minute. The film is advanced from pre-heat roll 380 to draw roll 390, over draw roll 390, between draw roll 390 and draw nip roll 400 to draw roll 410, over draw roll 410 and then between draw roll 410 and draw nip roll 420 to guide roll 430. Draw roll 390 is operated at a temperature of about 200° F. (93.3° C.) to about 290° F. (143.3° C.), and in one embodiment at about 270° F. (132.2° C.). The film is advanced over draw roll 390 at a rate of about 40 to about 130 feet per minute, and in one embodiment at about 89 feet per minute. Draw roll 410 is operated at a temperature of about 200° F. (93.3° C.) to about 280° F. (137.8° C.), and in one embodiment at about 270° F. (132.2° C.). The film is advanced over draw roll 410 at a rate of about 300 to about 600 feet per minute, and in one embodiment at about 402 feet per minute. The effect of advancing the film from draw roll 390 to draw roll 410 is to stretch the film sufficiently to provide the film with a machine direction orientation. The stretch ratio may range from about 4.4 to about 5.2, and in one embodiment at about 4.5 to about 4.9. The film is then advanced from annealing roll 440 to annealing roll 450. Annealing roll 440 is operated at a temperature of about 100° F. (37.8° C.) to about 150° F. (65.6° C.), and in one embodiment at about 120° F. (48.9° C.). Annealing roll 450 is operated at a temperature of about 70° F. (21.1 ° C.) to about 120° F. (48.9° C.), and in one embodiment at about 85° F. (29.4° C.). The film is advanced over annealing rolls 440 and 450 at a rate of about 285 to about 400 feet per minute, and in one embodiment at about 345 feet per minute. The film is then advanced from annealing roll 450 to cooling roll 460, over cooling roll 460 and between cooling roll 460 and cooling nip roll 470 to cooling roll 480, over cooling roll 480 to guide roll 490, over guide roll 490 to cooling roll 500, over cooling roll 500 and between cooling roll 500 and cooling nip 505 to nip rolls 510. Cooling roll 460 is operated at a temperature of about 70° C. (21.1° C.) to about 150° F. (65.6° C.), and in one embodiment at about 120° F. (48.9° C.). Cooling roll 480 is operated at a temperature of about 65° F. (18.3° C.) to about 120° .F (48.9° C.), and in one embodiment at about 85° F. (29.4° C.). Cooling roll 500 is operated at a temperature of about 65° F. (18.3° C.) to about 120° F. (48.9° C.), and in one embodiment at about 70° F. (21.1° C.). The film is advanced over cooling rolls 460, 480 and 500 at a rate of about 300 to about 600 feet per minute, and in one embodiment about 345 feet per minute. The film is advanced through nip rolls 510 to guide roll 520, then over guide roll 520 to corona treating station 540. The thickness of the film is monitored using film thickness measuring device 530 which is positioned at the entrance to the corona treating station 540. In the corona treating station, both sides of the film are treated to increase surface energy. The surface energy on the surface of the first skin layer 120 is increased sufficiently to enhance adhesion of ink to the surface during subsequent printing operations. The surface energy of the surface of the second skin layer 130 is increased sufficiently to increase adhesion of the in-mold label to the polymeric container during the container formation step. The film is advanced from the corona treating station 540 through nip rolls 550 to roll 560 where it is wound on the roll for subsequent processing. The film is advanced through corona treating station at a rate of about 300 to about 600 feet per minute, and in one embodiment about 345 feet per minute.

The hot-stretching and annealing of the film increases stiffness of the film in the machine direction but leaves the film relatively flexible in the cross direction. This process may be referred to as uniaxial stretching. In one embodiment, it is contemplated to use unbalanced or balanced biaxial stretching of the film to achieve a satisfactory stiffness differential between the machine and cross directions, with the degrees of stretching and stiffness in the machine direction exceeding those in the cross direction. Whether the stretching is biaxial or uniaxial, that is, whether there is little (relatively) or no stretching in the cross direction, the degree of stretching in the machine direction exceeds that in the cross direction so that the film is substantially stiffened in the machine direction and remains relatively flexible in the cross direction. Therefore the film, whether uniaxially or biaxially stretched, may be referred to as having a machine direction stiffness differential. In one embodiment, the Gurley stiffness in the machine direction is from about 30 to about 120, and in one embodiment about 40 to about 60. The cross-direction Gurley stiffness may be from about 30 to about 120, and in one embodiment, from about 35 to about 45. Gurley stiffness is measured using test method Tappi T543PM-84.

Uniaxial hot-stretching and annealing are also important to the development of in-mold label film tensile properties necessary to withstand the mechanical and thermal stresses of conventional printing techniques of the type used in processing paper labels. The stretched and annealed film should have a tensile modulus greater than about 65,000 psi and an elongation at break of less than about 950%. Tensile properties including elongation and modulus are measured using the method set forth in ASTM D882-97.

The inventive films are characterized by a machine direction shrinkage after hot-stretching and annealing of less than about 2%, and in one embodiment less than about 1.5%, and in one embodiment less than about 1%, and in one embodiment less than about 0.75%, and in one embodiment in the range of about 0.1 to about 1%, and in one embodiment in the range of about 0.25 to about 0.75%. Shrinkage is determined using test method ASTM D 2739-96.

The inventive films are characterized by a shrink tension at 200° F. of less than about 100 psi, and in one embodiment less than about 50 psi, and in one embodiment less than about 30 psi. Shrink tension is measured using test method ASTM D2838.95.

Figure 6:
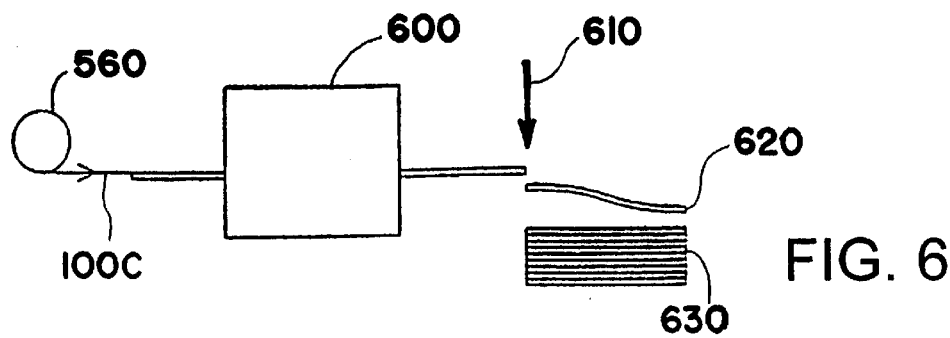
FIG. 6 is a diagrammatic representation of a printing, cutting and stacking line used in making the inventive in-mold labels.

As schematically illustrated in FIG. 6, the stretched and annealed 100C, which may be supplied in the form of self-wound roll 560, may be printed or decorated in a printing press 600 in which the film is subjected to mechanical and thermal stress incident to the printing itself and to the drying of the ink by exposure to heat as such or by exposure to ultraviolet radiation which tends to also generate infrared radiation.

Following printing and drying, the film may be sheeted and stacked in a manner similar to that known for the sheeting of paper-backed label stock. Cutting is indicated by arrow 610 in the drawings. The severed sheets 620 are stacked to form stack 630. The stack may contain, for example, 100 or 200 sheets. For clarity of illustration, in the drawing the thickness of the sheets is greatly exaggerated and the stack 630 is therefore shown as made up of only a relatively small number of sheets. Each sheet in the stack is intended to provide material for several individual labels to be die-cut from the sheeted material. In the particular example described, nine labels are die-cut from each sheet. The sheets in the stack are accurately registered with each other so that the labels to be cut from the sheet will be formed in correct registration to the printing that appears on their face according to the pattern printed by the press 600.

If the film is too limp, accurate stacking is prevented due to the inability to guidingly control positioning of a limp sheet by means of belts, guideways, stops or similar guiding mechanisms (not shown) with any degree of accuracy. The stiffening of the inventive film by hot-stretching to desired stiffnesses, as discussed above, allows for accurate stacking to be achieved.

Accurate stacking and subsequent handling of the sheets or labels formed therefrom is also impeded if static charges are present on the sheets or labels. The antistatic additives discussed above act to remove or dissipate static charges.

Figure 7:
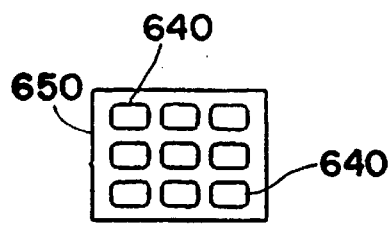
FIGS. 7–10 diagrammatically illustrate the punch-cutting of the inventive in-mold labels to form stacks of labels.
Figure 8:
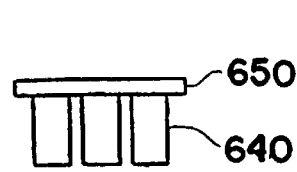
Figure 9:
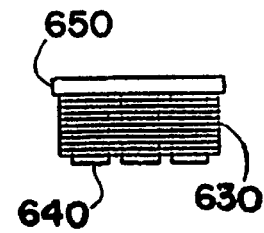
Figure 10:

Individual labels are formed in a known manner by hollow punches or cutting dies 640 carried on a head 650, seen in bottom plan view in FIG. 7 and in side elevation in FIGS. 8 and 9. The cutting dies punch out the labels from the stack 630, producing in each cutting cycle a number of stacks 660 of individual labels shown in FIG. 10. In the particular example described, nine stacks of individual labels are produced in each cutting cycle.

Alternatively, following printing and drying, the stock may be fed into a rotary steel die (not shown) at the end of the printing press line and cut into labels. As the cut labels and surrounding matrix of waste material exit from the rotary steel die, the matrix is pulled away at an angle from the labels which are sufficiently stiff to continue their forward travel into a nip of a pair of feed belts (not shown) for collection into stacks 660. Thus, the machine direction stiffness is utilized in a direct label cutting and separating process which eliminates the cutting step at 610 as well as the other steps described with respect to FIGS. 7, 8 and 9.

The stacks 660 of individual labels are stabilized by suitable wrapping or packaging (not shown) in a manner similar to that previously used with paper-backed labels. The stabilized stacks 660 are then moved or transported to the site where the blow-molded, injection molded or injection-blown containers are being manufactured, which often is at a different place than the site of label manufacture.

Figure 11:
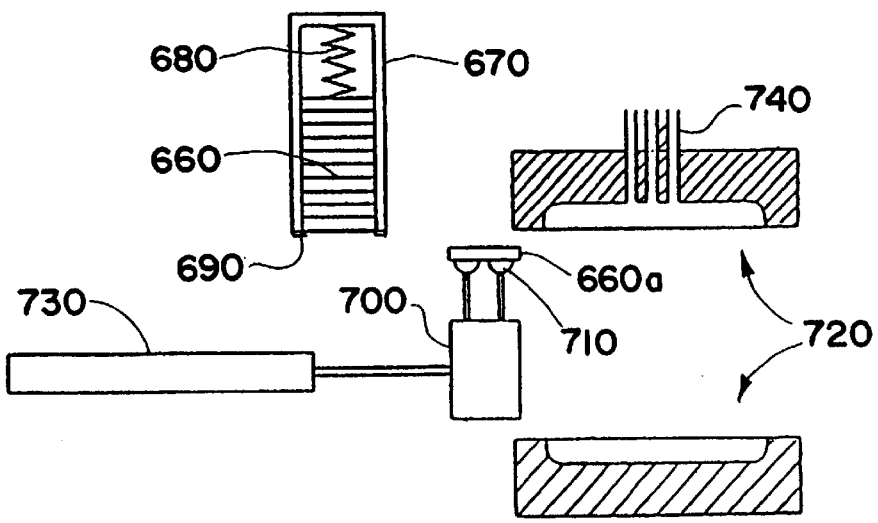
FIG. 11 diagrammatically illustrates the use of the stacked labels in a molding operation.

At the site of container manufacture, stacks 660 of individual labels are loaded in dispensing magazine 670 as schematically illustrated in FIG. 11. For example, the labels may be advanced to the front of the magazine by a spring 680, and may be lightly retained for pick-off by mechanically retracting retainer fingers 690. A robotic label feed head 700 carries vacuum cups 710 adapted to be advanced by a mechanism (not shown) internal to the head 700 to pick off the front label 660*a* in the stack 660. The vacuum cups are retracted for translating movement of the head and the single picked-off label 660*a* into the opened mold 720. Movement of the head 700 is actuated by translating cylinder 730. The vacuum cups 710 are advanced again to apply the picked-off label 660*a* to the interior surface of the mold and release it. The label may then be held accurately in position within the mold by vacuum applied to the mold wall through vacuum lines 740 while the label feed head 700 is retracted. The vacuum line outlets to the interior of the mold may be flush with the interior surface of the mold, as shown, so that the label occupies part of the mold cavity proper. In other words, there is no recess on the interior mold surface to accommodate the label.

A hot workpiece or parison (not shown) of high density polyethylene or similar thermoplastic resin is fed into the mold 720, the mold is closed, and the parison is expanded in a known manner to complete the formation of the molded container. The hot-stretching and annealing temperatures used in making the inventive film exceed the service temperature in the mold. To assure a uniform joining of the label to the container, it is desirable that the softening temperature of the in-mold label film be close to the service temperature. If the label is on, not in, the interior surface of the mold, the label becomes embedded in the workpiece to which it is adhered, thus advantageously providing an inset label that is flush with the container surface and that replaces and therefore saves a portion of the charge for the molded workpiece or container without diminishing the structural integrity of the workpiece to any detected degree.

The print surface of the inventive in-mold labels, after being adhered to a container, is characterized by a surface roughness, $R_a$, of up to about 100 microinches, and in one embodiment about 5 to about 100 microinches, and in one embodiment about 5 to about 75 microinches, and in one embodiment about 10 to about 50 microinches, and in one embodiment about 15 to about 35 microinches, as determined by test method ANSI B46.1.

The following examples are provided to further disclose the invention.

EXAMPLE 1

A multilayered film corresponding to film 100B in FIG. 3 and having a thickness of 4.0 mils is prepared by co-extruding, stretching and annealing the following layers (all percentages being by weight):

Core Layer 110—60% of total film thickness
    62.0% Schulman Polybatch PF92D (40.0% $CaCO_3$ dispersed in polypropylene)
    11.0% Schulman Polybatch P8555-SD (50.0% $TiO_2$ dispersed in polypropylene)
    27.0% Union Carbide-Dow 5A97 (polypropylene)

First Skin layer 120 and second skin layer 130—10% of total film thickness for each layer
    50.0% Union Carbide-Dow 5A97
    50.0% AT Plastics EVA 1821

Tie Layers 140 and 150—10% of total film thickness for each layer
    50.0% Union Carbide-Dow 5A97
    50.0% AT Plastics EVA 1821

The above-indicated multilayered film is co-extruded, hot-stretched and annealed using the line illustrated in FIG. 5 under the conditions indicated below. In the table below, the term "fpm" stands for feet per minute.

| Cast roll 270 | |
| --- | --- |
| Temp | 100° F. |
| Rate (line speed) | 25 fpm |
| Cast roll 280 | |
| Temp | 80° F. |
| Rate (line speed) | 35 fpm |
| Pre-heat roll 370 | |
| Temp | 245° F. |
| Rate (line speed) | 35 fpm |
| Pre-heat roll 380 | |
| Temp | 250° F. |
| Rate (line speed) | 26 fpm |
| Draw roll 390 | |
| Temp | 260° F. |
| Rate (line speed) | 26 fpm |
| Draw roll 410 | |
| Temp | 260° F. |
| Rate (line speed) | 142 fpm |
| Annealing roll 440 | |
| Temp | 260° F. |
| Rate (line speed) | 134 fpm |
| Annealing roll 450 | |
| Temp | 260° F. |
| Rate (line speed) | 127 fpm |
| Cooling roll 460 | |
| Temp | 120° F. |
| Rate (line speed) | 128 fpm |

-continued

| Cooling roll 480 | |
|---|---|
| Temp | 65° F. |
| Rate (line speed) | 128 fpm |
| Cooling roll 500 | |
| Temp | 70° F. |
| Rate (line speed) | 125 fpm |

The film produced above has the following properties. In the table below, the term "psi" refers to pounds per square inch.

| Gurly Stiffness (Tappi T543 PM-84) | |
|---|---|
| Machine Direction | 99 |
| Cross Direction | 52.3 |
| Opacity (Tappi T425 OS-75) | 93.0 |
| Surface energy in dynes after 10 days of production | |
| Print Side | 37 |
| Base Side | 36 |
| Coefficient of Friction (Print/Base) (ASTM D1894-95) | |
| Static | 0.54 |
| Kinetic | 0.46 |
| % Ash (ASTM D5630-94) | 17.7 |
| Secant Modulus (psi) (ASTM D882-97) | |
| Machine Direction | 189,500 |
| Cross Direction | 87,385 |
| Elongation (%) (ASTM D882-97) | |
| Machine Direction | 27 |
| Cross Direction | 263 |
| Tensile Yield (lbs) (ASTM D882-97) | |
| Machine Direction | 27 |
| Cross Direction | 263 |
| Ultimate Tensile (lbs) (ASTM D882-97) | |
| Machine Direction | 23,180 |
| Cross Direction | 2674 |
| Shrinkage (%) (ASTM D2739-96) | |
| Machine Direction | 2.0 |
| Cross Direction | −0.15 |
| Shrink Tension (psi) (ASTM D2838-95) @ | |
| 260° F. (126.7° C.) | 98.1 |

EXAMPLE 2

A multilayered film corresponding to film 100B in FIG. 3 is prepared by co-extruding, hot-stretching and annealing a film extrudate to make a four-mil multilayered film having the following layers (all percentages being by weight):

Core Layer 110—74.0% of total film thickness
40.0% Schulman PF97N
12.0% Schulman Polybatch P8555-SD
46.5% Union Carbide-Dow 5A97
1.5% Schulman Polybatch VLA-55-SF
First skin layer 120 and second skin layer 130—7.75% of total film thickness for each layer 1.5% Schulman Polybatch VLA-55-SF
73.5% Equistar H 6012
25.0% AT Plastics EVA 1821
Tie Layers 140 and 150—5.25% of total film thickness for each layer
50.0% ExxonMobil Optema TC120
48.5% Union Carbide-Dow 5A97
1.5% Schulman Polybatch VLA-55-SF The above-indicated multilayered film is co-extruded, hot-stretched and annealed using the line illustrated in FIG. 5 under the conditions indicated below.

| Cast roll 270 | |
|---|---|
| Temp | 150° F. |
| Rate (line speed) | 62 fpm |
| Cast roll 280 | |
| Temp | 120° F. |
| Rate (line speed) | 63 fpm |
| Pre-heat roll 370 | |
| Temp | 260° F. |
| Rate (line speed) | 62 fpm |
| Pre-heat roll 380 | |
| Temp | 260° F. |
| Rate (line speed) | 65 fpm |
| Draw roll 390 | |
| Temp | 260° F. |
| Rate (line speed) | 65 fpm |
| Draw roll 410 | |
| Temp | 260° F. |
| Rate (line speed) | 298 fpm |
| Annealing roll 440 | |
| Temp | 265° F. |
| Rate (line speed) | 259 fpm |
| Annealing roll 450 | |
| Temp | 265° F. |
| Rate (line speed) | 258 fpm |
| Cooling roll 460 | |
| Temp | 120° F. |
| Rate (line speed) | 258 fpm |
| Cooling roll 480 | |
| Temp | 85° F. |
| Rate (line speed) | 257 fpm |
| Cooling roll 500 | |
| Temp | 70° F. |
| Rate (line speed) | 259 fpm |

The film produced above has the following properties:

| Gurly Stiffness (Tappi T543 PM-84) | |
|---|---|
| Machine Direction | 67.3 |
| Cross Direction | 42.1 |
| Opacity (Tappi T425 OS-75) | 90.1 |
| Surface energy in dynes after 10 days of production | |
| Print Side | 47 |
| Base Side | 45 |
| Coefficient of Friction (Print/Base) | |

-continued

| (ASTM D1894-95) | |
|---|---|
| Static | 0.37 |
| Kinetic | 0.28 |
| % Ash (ASTM D5630-94) | 21.3 |
| Secant Modulus (psi) (ASTM D882-97) | |
| Machine Direction | 162,908 |
| Cross Direction | 89,587 |
| Elongation (%) (ASTM D882-97) | |
| Machine Direction | 57 |
| Cross Direction | 115.5 |
| Tensile Yield (lbs) (ASTM D882-97) | |
| Machine Direction | 64.8 |
| Cross Direction | 10.0 |
| Ultimate Tensile (lbs) (ASTM D882-97) | |
| Machine Direction | 16,047 |
| Cross Direction | 2439 |
| Shrinkage (%) (ASTM D2739-96) | |
| Machine Direction | 0.52 |
| Cross Direction | 0.20 |
| Shrink Tension (psi) (ASTM D2838-95) @ | |
| 240° F. (115.6° C.) | 64 |
| 260° F. (126.7° C.) | 77.2 |

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayered film for use in making an in-mold label, comprising:
    a core layer having a first surface and a second surface, the core layer comprising a polymeric material and particulate solids dispersed in the polymeric material, the polymeric material being a high density polyethylene, a polypropylene, a polystyrene, a polyester, a copolymer of ethylene and propylene, a polyester copolymer, a polyamide, a polycarbonate or a mixture of two or more thereof;
    a first skin layer overlying the first surface of the core layer, the first skin layer comprising a thermoplastic copolymer or terpolymer derived from ethylene or propylene and a functional monomer selected from the group consisting of alkyl acrylate, acrylic acid, alkyl acrylic acid, vinyl acetate and combinations of two or more thereof;
    the film being formed by co-extruding the core layer and first skin layer to form the multilayered film, hot-stretching the film at a temperature above the expected service temperature of the label to provide the film with a machine direction orientation, and annealing the film at a temperature above the expected service temperature of the label;
    the density of the film being reduced by about 5% to about 25% during hot-stretching;
    the film having a machine direction Gurley stiffness value in the range of about 30 to about 120 after hot-stretching and annealing;
    the film having a machine direction shrinkage of less than about 2% after hot-stretching and annealing;
    the film having a machine direction shrink tension at 200° F. (93.3° C.) of less than about 100 psi after hot-stretching and annealing.

2. The film of claim 1 wherein the film further comprises a first opacifying layer positioned between the first surface of the core layer and the first skin layer.

3. The film of claim 1 wherein the polymeric material is polypropylene.

4. The film of claim 1 wherein the particulate solids are comprised of calcium carbonate.

5. The film of claim 1 wherein the core layer contains about 15 to about 35 percent by weight particulate solids.

6. The film of claim 1 wherein the core layer further comprises an antistatic additive.

7. The film of claim 1 wherein the core layer further comprises a pigment.

8. The film of claim 1 wherein the first skin layer further comprises a thermoplastic polymeric material selected from high density polyethylene, polystyrene, rubber modified polystryene, acrylonitrile butadiene styrene, polypropylene, polyvinylidene fluoride, polyester, cylic olefin copolymer, and mixtures of two or more thereof.

9. The film of claim 1 wherein the film further comprises a first tie layer positioned between the first surface of the core layer and the first skin layer.

10. The film of claim 9 wherein the first tie layer comprises an ethylene vinyl acetate copolymer, ethylene methyl acrylate copolymer, ethylene butyl acrylate copolymer, or mixture of two or more thereof.

11. The film of claim 1 wherein the film further comprises a second skin layer overlying the second surface of the core layer.

12. The film of claim 11 wherein the film further comprises a first opacifying layer positioned between the first surface of the core layer and the first skin layer, and a second opacifying layer positioned between the second surface of the core layer and the second skin layer.

13. The film of claim 11 wherein the film further comprises a first opacifying layer positioned between the first surface of the core layer and the first skin layer, a first tie layer positioned between the first opacifying layer and the first skin layer, a second opacifying layer positioned between the second surface of the core layer and the second skin layer, and a second tie layer positioned between the second opacifying layer and the second skin layer.

14. The film of claim 11 wherein the first skin layer and the second skin layer comprise: a high density polyethylene or a polypropylene; and an ethylene vinyl acetate copolymer or an ethylen methyl acrylate copolymer.

15. The film of claim 11 wherein the film further comprises a first tie layer positioned between the first surface of the core layer and the first skin layer, and a second tie layer positioned between the second surface of the core layer and the second skin layer.

16. The film of claim 15 wherein the first tie layer and the second tie layer comprise: a high density polyethylene or a polypropylene; and an ethylene vinyl acetate copolymer or an ethylene methylacrylate copolymer.

17. An in-mold label having a surface area of at least about 12 square inches made from the film of claim 1.

18. An in-mold label made from the film of claim 1.

19. A polymeric container having a capacity of at least about 32 fluid ounces with the label of claim 18 adhered to it, the first skin layer of the label having an ink-printed surface, the ink-printed surface having a surface roughness of up to about 100 microinches as determined by test method ANSI B46.1.

20. A multilayered film for use in making an in-mold label, comprising:

a core layer having a first surface and a second surface;

a first skin layer overlying the first surface of the core layer; and a second skin layer overlying the second surface of the core layer;

the core layer comprising a polymeric material and particulate solids dispersed in the polymeric material, the polymeric material being of a high density polyethylene, a polypropylene, a polystyrene, a polyester, a copolymer of ethylene and propylene, a polyester copolymer, a polyamide, a polycarbonate or a mixture of two or more thereof;

the first skin layer and the second skin layer independently comprising a thermoplastic copolymer or terpolymer derived from ethylene or propylene and a functional monomer selected from the group consisting of alkyl acrylate, acrylic acid, alkyl acrylic acid, vinyl acetate and combinations of two or more thereof;

the film being formed by co-extruding the core layer, first skin layer and second skin layer to form the multilayered film, hot-stretching the film at a temperature above the expected service temperature of the label to provide the film with a machine direction orientation, and annealing the film at a temperature above the expected service temperature of the label;

the density of the film being reduced by about 5% to about 25% during hot-stretching;

the film having a machine direction Gurley stiffness value in the range of about 30 to about 120 after hot-stretching and annealing;

the film having a machine direction shrinkage of less than about 2% after hot-stretching and annealing;

the film having a machine direction shrink tension at 200° F. (93.3° C.) of less than about 100 psi after hot-stretching and annealing.

21. A multilayered film for use as an in-mold label, comprising:

a core layer having a first surface and a second surface;

a first skin layer overlying the first surface of the core layer;

a first tie layer positioned between the first surface of the core layer and the first skin layer;

a second skin layer overlying the second surface of the core layer;

a second tie layer positioned between the second surface of the core layer and the second skin layer;

the core layer comprising a polymeric material and particulate solids dispersed in the polymeric material, the polymeric material being a high density polyethylene, a polypropylene, a polystyrene, a polyester, a copolymer of ethylene and propylene, a polyester copolymer, a polyamide, a polycarbonate or a mixture of two or more thereof;

the first skin layer and the second skin layer independently comprising a thermoplastic copolymer or terpolymer derived from ethylene or propylene and a functional monomer selected from the group consisting of alkyl acrylate, acrylic acid, alkyl acrylic acid, vinyl acetate and combinations of two or more thereof;

the film being formed by co-extruding the core layer, first skin layer, second skin layer and the tie layers to form the multilayered film, hot-stretching the film at a temperature equal to or above the expected service temperature of the label to provide the film with a machine direction orientation, and annealing the film at a temperature above the expected service temperature of the label;

the density of the film being reduced by about 5% to about 25% during hot-stretching;

the film having a machine direction Gurley stiffness value in the range of about 30 to about 120 after hot-stretching and annealing;

the film having a machine direction shrinkage of less than about 2% after hot-stretching and annealing;

the film having a machine direction shrink tension at 200° F. (93.3° C.) of less than about 100 psi after hot-stretching and annealing.

22. A multilayered film for use as an in-mold label, comprising:

a core layer having a first surface and a second surface;

a first skin layer overlying the first surface of the core layer;

a first opacifying layer positioned between the first surface of the core layer and the first skin layer;

a first tie layer positioned between the first opacifying layer and the first skin layer;

a second skin layer overlying the second surface of the core layer;

a second opacifying layer positioned between to the second surface of the core layer and the second skin layer;

a second tie layer positioned between the second opacifying layer and the second skin layer;

the core layer comprising a polymeric material and particulate solids dispersed in the polymeric material, the polymeric material being a high density polyethylene, a polypropylene, a polystyrene, a polyester, a copolymer of ethylene and propylene, a polyester copolymer, a polyamide, a polycarbonate or a mixture of two or more thereof;

the first skin layer and the second skin layer independently comprising a thermoplastic copolymer or terpolymer derived from ethylene or propylene and a functional monomer selected from the group consisting of alkyl acrylate, acrylic acid, alkyl acrylic acid, vinyl acetate and combinations of two or more thereof;

the film being formed by co-extruding the core layer, first skin layer, second skin layer, first and second opacifying layers, and first and second tie layers to form the multilayered film, hot-stretching the film at a temperature above the expected service temperature of the label to provide the film with a machine direction orientation, and annealing the film at a temperature above the expected service temperature of the label;

the density of the film being reduced by about 5% to about 25% during hot-stretching;

the film having a machine direction Gurley stiffness value in the range of about 30 to about 120 after hot-stretching and annealing;

the film having a machine direction shrinkage of less than about 2% after hot-stretching and annealing;

the film having a machine direction shrink tension at 200° F. (93.3° C.) of less than about 100 psi after hot-stretching and annealing.

23. A polymeric container with the label of claim 22 adhered to it, the first skin layer of the label having an ink-printed surface, the ink-printed surface having a surface roughness of up to about 100 microinches as determined by test method ANSI B46.1.

* * * * *